United States Patent [19]

Allen

[11] 4,056,119
[45] Nov. 1, 1977

[54] SOLENOID VALVE

[75] Inventor: Walter E. Allen, Prospect, Conn.

[73] Assignee: Peter Paul Electronics Co., Inc., New Britain, Conn.

[21] Appl. No.: 698,746

[22] Filed: June 22, 1976

Related U.S. Application Data

[62] Division of Ser. No. 498,089, Aug. 16, 1974, Pat. No. 3,965,923.

[51] Int. Cl.² .............................................. F16K 31/02
[52] U.S. Cl. ................................. 137/315; 137/454.6; 137/596.17; 137/861; 137/625.65
[58] Field of Search ............... 137/315, 454.6, 596.17, 137/608, 625.65; 91/465

[56] References Cited

U.S. PATENT DOCUMENTS

| | | | |
|---|---|---|---|
| 2,821,997 | 2/1958 | Clay et al. | 137/596.17 |
| 2,886,063 | 5/1959 | Ray | 137/625.5 X |
| 3,102,712 | 9/1963 | Zilk | 251/138 X |
| 3,683,962 | 8/1972 | Good | 251/138 X |
| 3,840,047 | 10/1974 | Gibbins | 137/608 |

FOREIGN PATENT DOCUMENTS

| | | | |
|---|---|---|---|
| 1,298,101 | 5/1962 | France | 137/625.5 |
| 50,537 | 12/1940 | France | 137/625.65 |
| 977,084 | 12/1964 | United Kingdom | 137/625.27 |

Primary Examiner—Alan Cohan
Assistant Examiner—Gerald A. Michalsky
Attorney, Agent, or Firm—McCormick, Paulding & Huber

[57] ABSTRACT

A solenoid-actuated four-way fluid control valve assembly has a body assembly mounting a pair of solenoids and defining two valve chambers each containing an axially elongated generally L-shaped plunger assembly and a pair of valve seats. Each plunger is spring biased to closing engagement with one of the valve seats and is shiftable axially to another position to open the one valve seat and close the other in response to energization of an associated one of the solenoids. A transfer plate mounted on the valve body determines flow paths through the valve assembly and carries needle valves for selectively regulating flow in each of the latter paths. The two plunger assemblies, the biasing springs therefor, and a cartridge which provides a closure for the two valve chambers comprise a cartridge assembly which may be removed from the valve body as a unit to facilitate repair or replacement of operational parts of the valve assembly.

11 Claims, 10 Drawing Figures

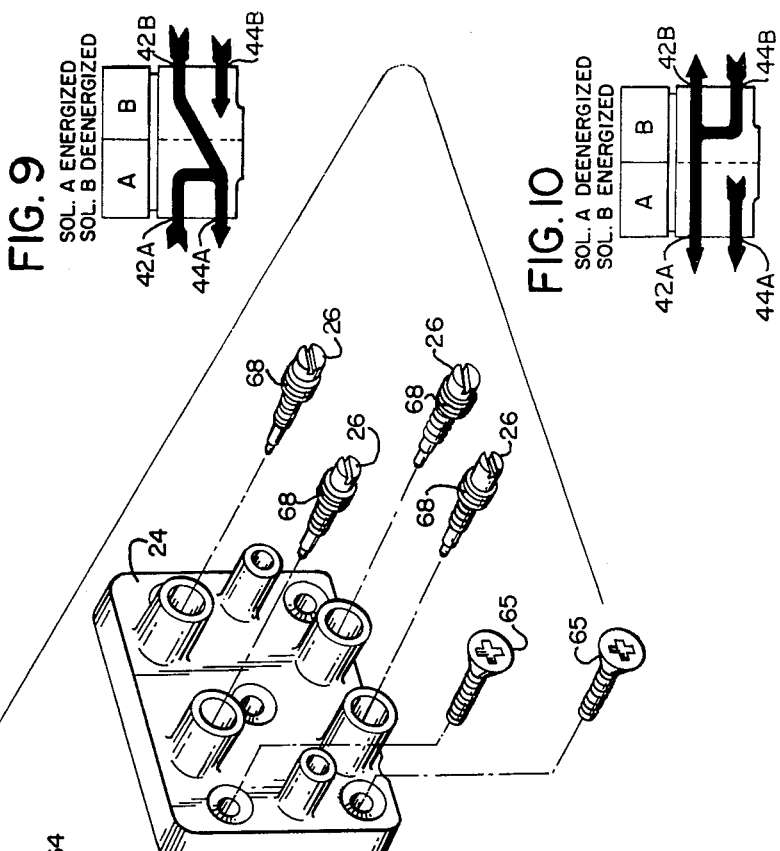
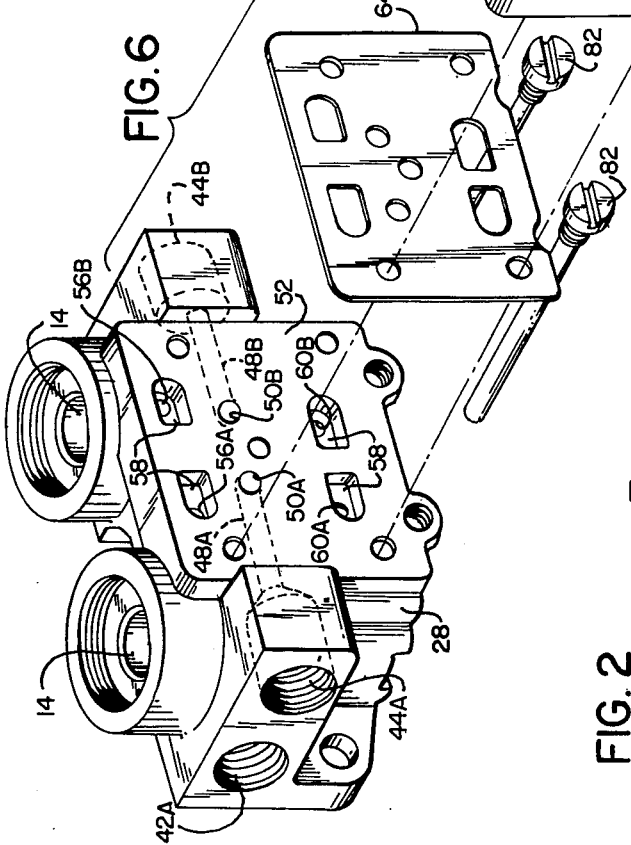
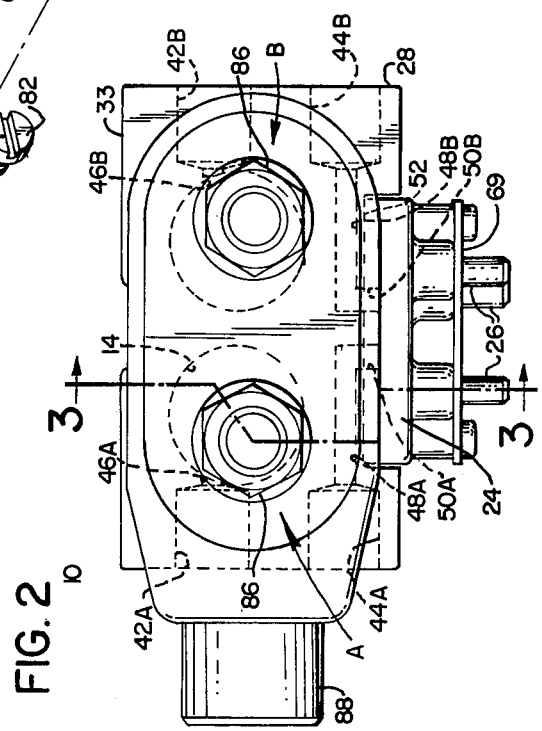

SOLENOID VALVE

This is a division of application Ser. No. 498,089, filed Aug. 16, 1974 now U.S. Pat. No. 3,965,923.

BACKGROUND OF THE INVENTION

This invention relates in general to solenoid valves and deals more particularly with improved multiple-way solenoid actuated control valves.

Conventional valves of the aforedescribed type generally have at least one cylindrical plunger supported in a bore and shiftable axially thereof between valve seats associated with opposite ends of the plunger. In such a structure, a portion of the plunger bore necessarily defines at least a part of a flow path through the valve. The latter flow path may, for example, be at least partially defined by slots in the plunger which extend longitudinally thereof. However, such arrangement tends to increase frictional forces within the valve and may impose limitations on valve operational speed. Accordingly, the general aim of the present invention is to provide an improved multi-way solenoid actuated control valve wherein the valve plunger bore does not define a portion of a flow path through the valve. The further aim of the invention is to provide an improved valve assembly which may be rebuilt in place, that is, while the valve assembly is mounted on associated equipment without requiring disconnection of the various fluid and electrical conduits connected thereto and which includes improved arrangement for metering flow in various flow paths therethrough.

SUMMARY OF THE INVENTION

In accordance with the present invention, an improved solenoid-actuated control valve assembly is provided which comprises a body assembly having at least one chamber containing a pair of opposing valve seats and a plunger assembly axially shiftable between one and another position relative to the body. The plunger assembly has a generally radially outwardly extending portion which is disposed between the valve seats for alternately engaging and closing one or the other of the valve seats. Means is provided for biasing the plunger to and normally retaining it in one of its positions to close one of the valve seats and yieldably resist shifting to its other position to close the other of the valve seats in response to operation of the solenoid. The plunger assembly, the biasing means and one of the valve seats may comprise part of a cartridge assembly which is removable from the valve body as a unit to facilitate the repair or replacement of operational parts. When the valve assembly is provided with two valve chambers, means may be provided for metering fluid flow in the paths therebetween.

BRIEF DESCRIPTION OF THE DRAWINGS

FIG. 2 is a plan view of the valve of FIG. 1.

FIG. 6 is an exploded perspective view of parts of the valve body assembly.

FIGS. 7–10 are schematic views which illustrate operation of the valve assembly.

DETAILED DESCRIPTION OF THE PREFERRED EMBODIMENT

Figure 1:
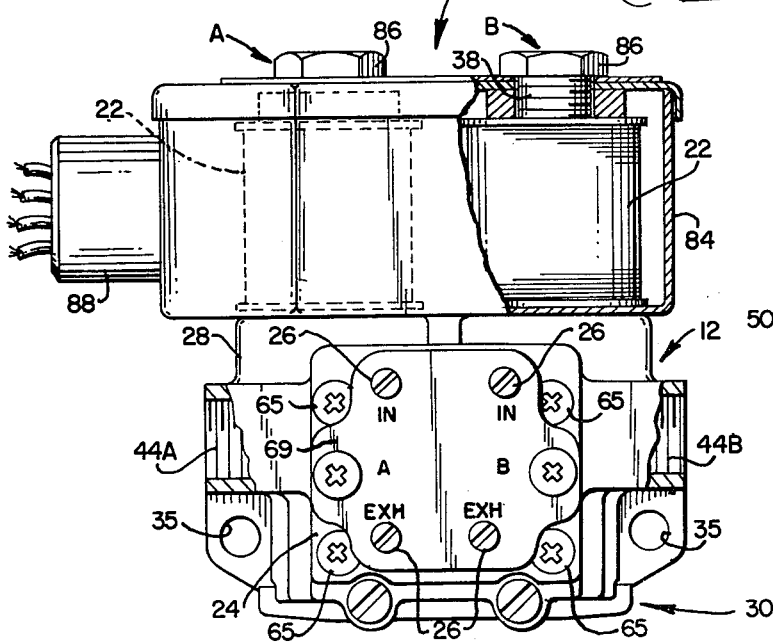
FIG. 1 is a front elevational view of a solenoid actuated four-way valve assembly embodying the present invention.

Turning now to the drawings, and referring particularly to FIGS. 1–3, the present invention is illustrated with reference to a solenoid actuated four-way fluid control valve assembly indicated generally by the reference numeral 10. The valve assembly 10 is particularly adapted for use in a pneumatic or hydraulic system and generally comprises a pair of substantially identical solenoid valves designated A and B which have a common body assembly indicated generally at 12. Each of the valves A and B has a chamber 14 which contains an associated plunger assembly 16 and a pair of opposing valve seats 18, 18. The plunger assembly 16 includes an axially elongated plunger portion and a radially outwardly extending portion which is disposed between the valve seats and has seating surfaces thereon for alternately engaging one and the other of the valve seats 18, 18. It is shiftable axially of the chamber 14 between one and another position and is biased to and normally retained in one of its positions by a compression spring, such as the spring 20, to close an associated one of the valve seats and yieldably resists shifting to its other position. A solenoid 22 mounted on the body assembly 12 is energized to shift the plunger assembly 16 from one to the other of its positions against the biasing force of the spring 20. A transfer and metering plate 24 comprises a part of the body assembly 12 and partially defines passageways therethrough which communicate with the chambers 14, 14 of the valves A and B to establish predetermined fluid flow paths through the valve assembly 10. Metering valves 26, 26 associated with the plate 24 may be selectively adjusted to regulate fluid flow in the various flow paths through the valve assembly 10, as will be hereinafter further discussed.

Considering now the common body assembly 12 in further detail, it comprises a valve body 28, the transfer and metering plate 24, a valve cartridge indicated generally at 30, and a pair of solenoid supporting sleeves 32, 32. The valve body 28 is preferably die cast from zinc or like material and, as viewed in FIGS. 1 and 6, is generally symmetrical about a vertical median plane which passes transversely therethrough, that is, the right-hand half of the valve body 28 is a substantial mirror image of the left-hand half thereof. Integral mounting pads at the rear of the valve body 28 generally define a rearwardly facing mounting surface 33 (FIG. 2) and have fastener receiving openings 35, 35 therethrough, best shown in FIG. 1. A pair of generally cylindrical stepped bores 34, 34 which open downwardly through the lower end of the valve body 28 partially define the chambers 14, 14. Each chamber is further defined by another somewhat smaller bore 36 of relatively short axial extent, in the upper end of the valve body 28, which communicates with an associated bore 34 and which is radially offset therefrom. Each chamber 14 is further defined by an associated solenoid supporting sleeve 32. The latter sleeve is made from non-magnetic material and has a diametrically enlarged flange at its lower end threaded into the upper end of the valve body 28 in coaxial alignment with an associated bore 36, as best shown in FIG. 2. The sleeve 32 comprises a generally cylindrical thin-walled tubular shell which projects upwardly from the valve body 28 and forms an upward extension of the bore 36. A plug 38 of magnetic material is welded or otherwise fixedly secured in the upper open end of the tubular sleeve and has an external thread at its upper end. The upper valve seats 18, 18 comprise stainless steel inserts respectively mounted in the valve body at the upper ends of the bores 34, 34.

Internally threaded in-line ports 42A, 42B and 44A, 44B, open through opposite ends of the valve body 28 to facilitate connection of the valve assembly 10 with fluid conduits in an associated pneumatic or hydraulic system. A plurality of passageways formed in the valve body 28 cooperate with other passageway defining means in the valve cartridge 30 and in the metering plate 24 to define various flow paths through the valve assembly 10. The passageways in the valve body associated with the valve A are hereinafter described.

Figure 3:
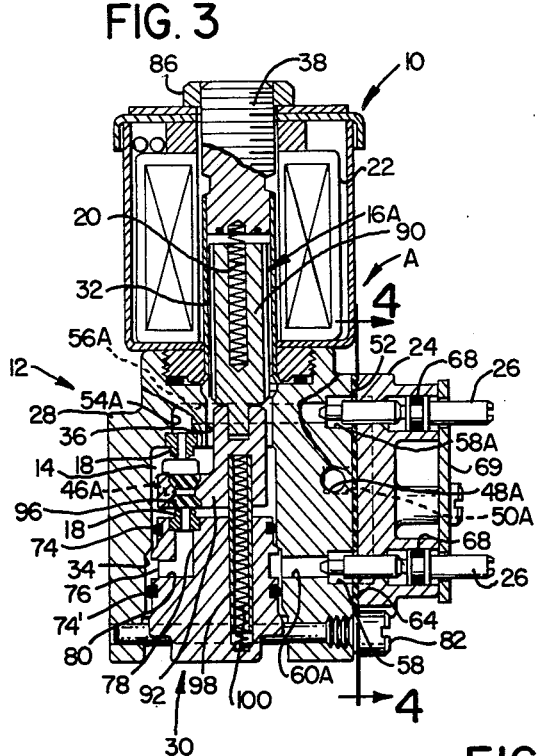
FIG. 3 is a sectional view taken generally along the line 3—3 of FIG. 2.

A passageway 46A extends inwardly from the inner end of each port 42A and opens through the wall of the bore 34 as best shown in FIGS. 2 and 3. Each port 44A has an associated passageway 48A which extends longitudinally inwardly therefrom and intersects a transverse passageway 50A which opens through a frontal surface 52 of the valve body 28. Another passageway 54A communicates with the upper valve seat 18 and intersects a transverse passageway 56A which opens through the frontal surface 52, as best shown in FIG. 3. The passageway 56A terminates at a recess 58 which opens through the frontal surface 52. Another passageway 60A formed in the lower frontal portion of the valve body 28 opens into the lower end of the bore 34 and communicates with another recess 58 which opens through the frontal surface 52. Each of the recesses 58, 58 has a forwardly facing seating surface at its inner end, as best shown in FIGS. 3 and 6. A plurality of substantially identical passageways formed in the right-hand half of the valve body 28 are associated with the valve B and, for convenience, are designated by the same numerals and a letter B suffix.

Figure 4:
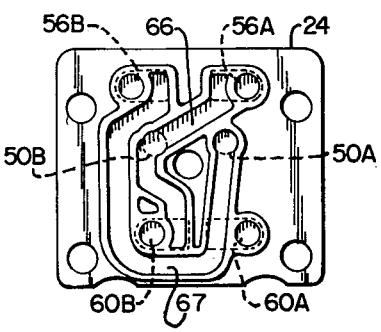
FIG. 4 is a sectional view taken along the line 4—4 of FIG. 3.

Fluid communication between the chambers 14, 14 is provided by the transfer and metering plate 24, which is preferably die cast from zinc or like material and secured in fluid tight engagement with the frontal surface 52 by a gasket 64 and a plurality of fasteners 65, 65. Serpentine recesses 66 and 67 formed in the metering plate 24 opens through the rear surface thereof, as best shown in FIG. 4, and cooperate with the frontal surface 52 and the various openings therethrough to define selected flow paths through the valve assembly 10. In FIG. 4, the rear surface of the metering plate 24 is shown, the various passageways associated with the frontal surface 52 being superimposed thereon and shown in broken lines. The recess 66 communicates with the inlet opening 50B and the passageways 56A and 60B. In generally like manner, the serpentine passageway 67 communicates with the opening 50A and the passageways 56B and 60A. The metering or needle valves 26, 26 are threaded into the metering plate 24, have tapered inner ends which respectively cooperate with the seating surfaces at the inner ends of the recesses 58, 58, and are accessible externally of the valve assembly 10 to regulate or meter flow in the various flow paths through the valve assembly 10. Each needle valve carries an O-ring 68 which is engaged in a cylindrical opening in the metering plate to provide a liquid tight seal therewith and to frictionally resist rotation relative thereto, whereby the various needle valves 26, 26 may be adjusted to and retained in selected regulating position to produce desired metered flow through the ports 42A, 42B and 44A, 44B. A nameplate 69 mounted on the metering plate 24 has port indicia thereon to indicate the ports controlled by the various needle valves 26, 26 as shown in FIG. 1.

Figure 5:
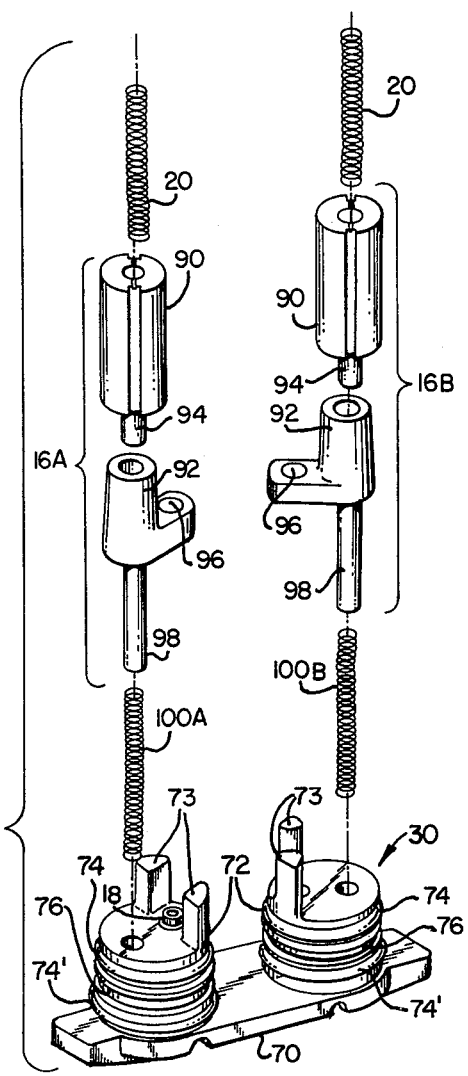
FIG. 5 is an exploded perspective view of the valve cartridge assembly.

The valve cartridge 30 is also preferably die case from zinc or like material and comprises a base portion 70 which carries a pair of spaced apart upwardly extending generally cylindrical portions 72, 72. Each cylindrical portion 72 is received in an associated bore 14 to provide a fluid tight closure therefore and has a pair of integral plunger arm guides 73, 73 which extend upwardly therefrom. Each cylindrical portion 72 has a pair of axially spaced annular recesses formed therein which contain O-rings 74, 74' for sealing engagement with an associated bore 14, as best shown in FIG. 3. An annular recess 76 formed in each cylindrical portion intermediate the O-rings 74, 74' further defines an associated one of the fluid passageways through the body assembly 12. Each cylindrical portion 72 also carries a lower valve seat or insert 18 which is preferably made from stainless steel and positioned generally between plunger arm guides 73, 73, as illustrated in FIG. 5. A passageway 78 communicates with each lower insert 18 and extends downwardly through each cylindrical portion 72 to intersect another passageway 80 which extends radially inwardly from the recess 76, as best illustrated in FIG. 3. The cartridge 30 is releasably retained in assembly with the valve body 28 by a pair of retaining screws 82, 82 which threadably engage the valve body and extend transversely thereof generally below the base portion 70.

The solenoids 22, 22 are contained within a housing 84 mounted on the upper end of the valve body 28. Each solenoid is received on and generally surrounds an associated sleeve 32. Nuts 86, 86 threaded on the upper ends of the plugs 38, 38 retain the solenoids and the housing 84 in assembly with the valve body 28. The housing 84 has an internally threaded connector 88 at one end thereof to facilitate connection of the solenoids to an electrical conduit. In FIGS. 1 and 2, the connector 88 is shown arranged for left-hand connection, however, the housing 84 may be assembled with the valve body in a reverse position to facilitate right-hand conduit connection.

Considering now the plunger assembly 16 in further detail and referring particularly to FIGS. 3 and 5, each plunger assembly 16 is preferably formed from two parts and includes a generally cylindrical plunger 90 and a plunger arm 92. The plunger 90 is made from magnetic material and has an upwardly opening spring receiving bore and a downwardly projecting shank 94. A pair of grooves formed in the peripheral surface of the plunger 90 provide fluid flow passages between the plunger and an associated sleeve 32 whereby to lubricate the plunger for sliding movement in the sleeve. The plunger arm 92 is preferably die cast from zinc or like material and has an upwardly opening bore which loosely receives the shank 94 whereby the plunger and plunger arm are retained in loosely connected coaxial end-to-end relation for axial movement relative to each other. The lower end portion of the arm extends radially outwardly and carries a resilient insert 96 made from synthetic rubber or other suitable material compatible with the fluid to be controlled and defines seating surfaces on the arm 92 for respectively engaging associated upper and lower valve seats 18, 18. The plunger arm 92 also includes a guide tube 98 which extends downwardly therefrom and is received in a guide bore in the cylindrical portion 72, as best shown in FIG. 3.

Referring now particularly to FIGS. 3 and 5, each plunger assembly 16 has a plunger spring and a cartridge spring associated therewith. The plunger spring is received within the plunger bore and acts between the plunger 90 and the plug 38 whereas the cartridge spring is received within the guide tube and acts between the plunger arm 92 and the valve cartridge 30. The plunger springs, designated 20, 20, are substantially identical and may, for example, exert biasing force of approximately 28 ounces. However, the cartridge spring in the valve A, designated 100A, may comprise a 20 ounce spring whereas the cartridge spring in the valve B, designated 100B, may be a somewhat lighter spring which may exert a 6 ounce biasing force.

In the illustrated embodiment 10, the valve A is normally open whereas the valve B is normally closed. When both solenoids are deenergized each plunger assembly 16A and 16B is biased into seating engagement with an associated lower valve seat 18 by its plunger spring 20. Fluid that may enter the chamber 14 of the valve A through the inlet passageway associated with its upper valve seat 18. Hence valve A is designated normally open. However, the lower valve seat 18 of valve B defines the inlet passageway for valve B and since this passageway is normally closed when solenoid B is deenergized valve B is designated normally closed.

When solenoid A is energized, the plunger assembly 16A moves upwardly to close the passageway associated with its upper valve seat 18. Since each plunger 90 is loosely connected to its associated plunger arm 92 by a shank 94, it will be evident that operation of solenoid A raises the associated plunger 90 against biasing force exerted by its plunger spring 20, however, the plunger arm 92 is urged upwardly towards seating engagement with the upper valve seat 18 by the spring 100A. Since the upper valve seat 18 of valve A defines a fluid inlet passageway, the cartridge spring 100A must exert sufficient biasing force to urge the plunger arm 92 into seating engagement with the upper valve seat against incoming fluid pressure. However, normally closed valve B is maintained in closed position against the pressure of incoming fluid by the plunger spring 20. Energization of solenoid B opens valve B. Hence the cartridge spring 100B is not required to hold its plunger arm 92 is a seated or closed position against the pressure of fluid entering the valve B and it is for this reason that the cartridge spring 100B may exert a lesser biasing force than the spring 100A.

The valve cartridge 30, the two plunger assemblies 16A and 16B and the springs 20, 20 and 100A and 100B associated therewith comprise a cartridge assembly, shown in FIG. 5. The latter assembly is releasably retained in assembled relation with the body assembly by the retaining screws 82, 82. It should be noted that the cartridge assembly may be removed from the valve body 28 while the valve assembly 10 is mounted in fixed position in an associated system. To rebuild the valve 10 is merely necessary to shut off the supply of air or hydraulic fluid to the valve, remove the two retaining screws 82, 82, drop the old cartridge assembly, replace it with a new one, replace the retaining screws, and restore the fluid supply source. The electrical and plumbing lines do not have to be disconnected to perform the latter operations. Thus, the valve 10 may be rebuilt, in place, at a fraction of its original cost by merely replacing the cartridge assembly.

Considering now the operation of the valve assembly 10, the manner in which the various ports 42A, 42B and 44A, 44B are interconnected when both solenoids are deenergized and when either and both solenoids are energized is illustrated schematically in FIGS. 7-10. It will be understood that the operational characteristics of the valve 10 may be altered by substituting for the plate 24 another transfer and metering plate which has different passageway configurations and providing cartridge springs which exert appropriate biasing force. Thus, if the transfer and metering plate is arranged so that both valve A and valve B are normally closed 6 ounce cartridge springs may, for example, be used in both valves. However, if both valves are to be normally open, two 20 ounce cartridge springs may be utilized. The specific spring characteristics may vary and will, of course, be determined by the operational pressures to which the valve is to be subjected.

I claim:

1. A solenoid actuated control valve comprising a body assembly including a body member having fluid inlet and outlet ports opening exteriorly thereof for connection with fluid conduits and first and second chamber bores opening outwardly therethrough and respectively partially defining first and second valve chambers, said body assembly including a pair of axially elongated tubular plunger sleeves attached to said body member and defining first and second plunger bores respectively communicating with said first and second chambers and having mounting means for securing said body member in fixed position on an associated supporting means, said body assembly including a cartridge member having connected first and second portions respectively received in said first and second chamber bores providing closures therefore and respectively further defining said first and second valve chambers and means for releasably retaining said cartridge member in assembly with said body member, a pair of valve seats in each of said chambers, means defining fluid passageways through said body assembly and communicating with said valve seats and said fluid inlet and outlet ports for defining fluid flow paths through said valve, a pair of solenoids each respectively mounted on an associated one of said sleeves, a pair of axially elongated plunger assemblies, each plunger assembly having a part thereof supported in an associated one of said plunger bores for axial shifting movement therein between one and another position, each of said plunger assemblies having a pair of seating surfaces thereon disposed in an associated one of said valve chambers, one of said seating surfaces engaging and closing one of said valve seats in said associated chamber when said plunger assembly is in one of its positions, the other of said seating surfaces engaging and closing the other of said valve seats when said plunger assembly is in the other of its positions, and means for biasing each of said plunger assemblies to and normally retaining it in one of its positions and yieldably resisting shifting thereof on energization of an associated one of said solenoids to the other of its positions to open said one of said valve seats and close said other of said valve seats, said cartridge member, said plunger assemblies and said biasing means comprising a cartridge subassembly which may be removed as a unit from said body assembly when said body assembly is mounted in fixed position on the supporting means by said mounting means and said inlet and outlet ports are connected to associated fluid conduit means.

2. A solenoid actuated control valve as set forth in claim 1 wherein each said pair of valve seats comprise opposing valve seats and each of said plunger assemblies includes an axially elongated plunger having a radially outwardly extending plunger arm disposed between an associated pair of said opposing valve seats, said pair of seating surfaces associated with said plunger assembly being disposed on opposite sides of said plunger arm.

3. A solenoid actuated control valve as set forth in claim 2 including means on said cartridge member for maintaining each said plunger arm between and in alignment with said associated pair of valve seats.

4. A solenoid actuating control valve as set forth in claim 3 wherein each of said cartridge portions comprising said first and second portions has a pair of plunger arm guides projecting therefrom and each plunger arm is received between said plunger arm guides on an associated one of said first and second portions and retained thereby against angular movement relative to said body member.

5. A solenoid actuated control valve as set forth in claim 1 wherein each of said plunger assemblies has an axially elongated plunger and a plunger arm extending generally radially outwardly beyond said plunger in fixed relation thereto and having a pair of seating surfaces on opposite sides thereof radially outwardly spaced from said plunger.

6. A solenoid actuated control valve as set forth in claim 1 wherein said cartridge member is further characterized by cylindrical first and second portions integrally connected by a base portion extending therebetween and each of said chamber bores comprises a generally cylindrical bore.

7. A solenoid actuated control valve as set forth in claim 6 wherein each of said valve seats comprises an insert carried by an associated one of the members comprising said body member and said cartridge member.

8. A solenoid actuated control valve as set forth in claim 1 wherein each said pair of valve seats comprises one valve seat on said body member and another valve seat on said cartridge member.

9. A solenoid actuated control valve as set forth in claim 1 wherein said body member has a first passageway therein communicating with said first chamber and opening through a surface of said body member and a second passageway therein communicating with said second chamber and opening through said surface, a transfer and metering plate mounted on said surface and cooperating therewith to define passageway means communicating with said first and second passageways to define a fluid flow path between said first and second chambers, and adjustable metering means mounted on said plate for selectively regulating fluid flow in said flow path between said first and second chambers.

10. A solenoid actuated control valve as set forth in claim 9 wherein said adjustable metering means comprises a needle valve threadably engaging said transfer and metering plate and adjustably movable toward and away from a valve seat defined by said body member and associated with one of said passageways which comprise said first and second passageways.

11. A solenoid actuated control valve as set forth in claim 1 wherein each of said plunger assemblies has a guide member projecting therefrom and each of said cartridge portions comprising said first and second portions has a guide bore slidably receiving an associated guide member therein.

* * * * *